United States Patent [19]

Finlay et al.

[11] Patent Number: 4,627,097

[45] Date of Patent: Dec. 2, 1986

[54] METHOD AND APPARATUS FOR IMPROVED PRINTING IN A SELECTED ORIENTATION

[75] Inventors: David E. Finlay, Boulder; Jesus C. Lopez, Longmont; Thomas S. Mereness, Boulder, all of Colo.

[73] Assignee: International Business Machines Corporation, Armonk, N.Y.

[21] Appl. No.: 665,210

[22] Filed: Oct. 26, 1984

[51] Int. Cl.$^4$ ............................................. G06K 9/36
[52] U.S. Cl. .................................................... 382/46
[58] Field of Search ................... 382/46, 44; 358/140; 340/727

[56] References Cited

U.S. PATENT DOCUMENTS 3,676,850  7/1972  Goldman et al. .................... 340/727
3,792,194  2/1974  Wood et al. ......................... 358/140
3,925,765  12/1975  Berwin et al. ....................... 340/727
3,976,982  8/1976  Eiselen ................................. 382/46
4,052,699  10/1977  Micka et al. ......................... 382/46
4,271,476  6/1981  Lotspiech ............................ 382/46

Primary Examiner—Stephen A. Kreitman
Attorney, Agent, or Firm—Pollock, Vande Sande & Priddy

[57] ABSTRACT

The invention provides a printer with a capability of printing in any one of a plurality of rotations. Component image data is stored in a library. The component image data is subdivided into data sets or quads. The size of a quad is selected so that it can be readily rotated with simple hardware. As the data sets are written to a buffer, they are rotated, and the locations in the buffer at which the different data sets are written depends on the selected rotation, to provide for data rotation "on the fly".

21 Claims, 19 Drawing Figures

 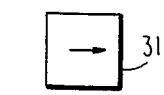  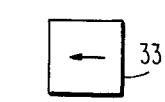
FIG.1  FIG.2  FIG.3  FIG.4
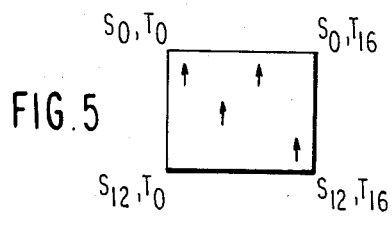
FIG.5
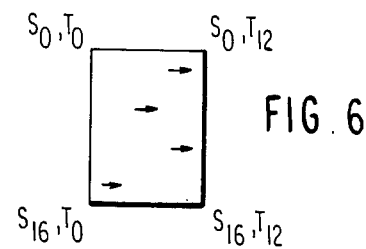
FIG.6
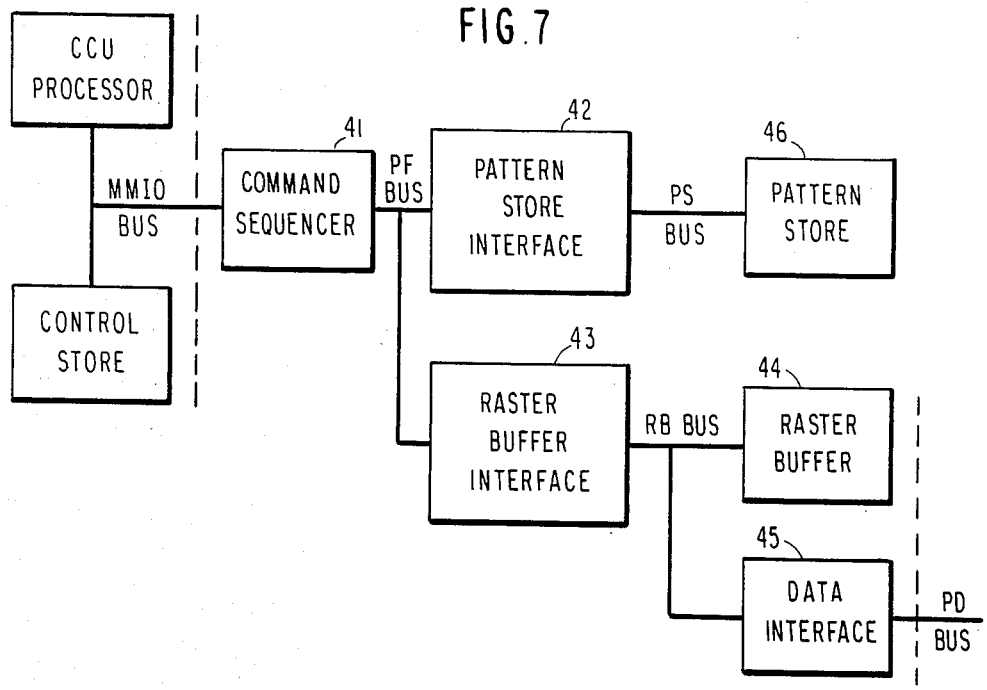
FIG.7

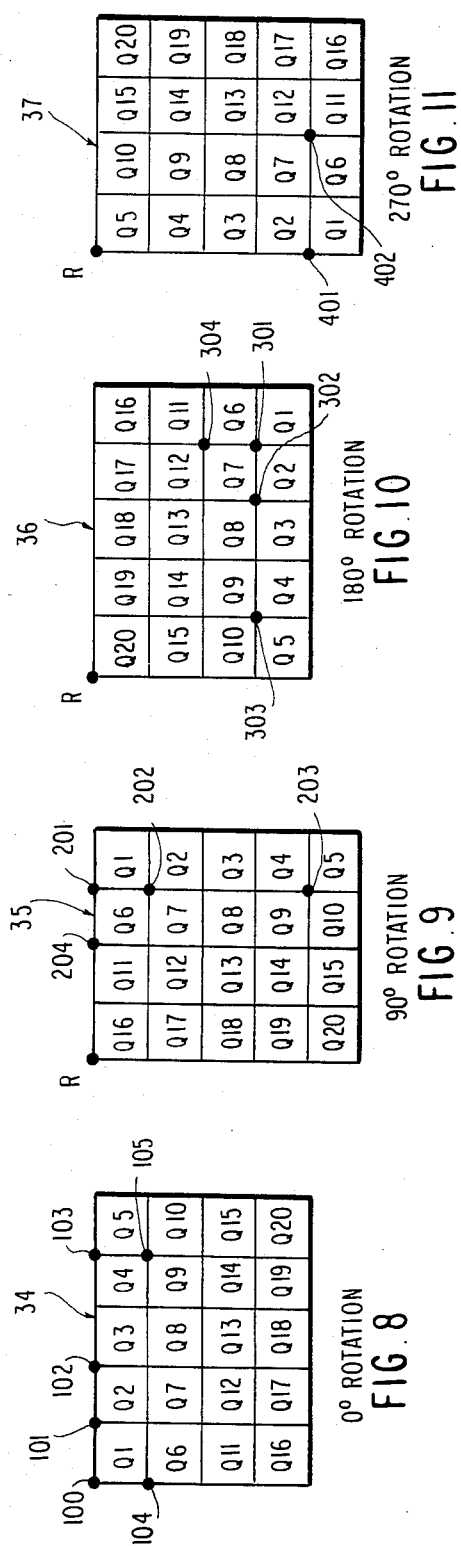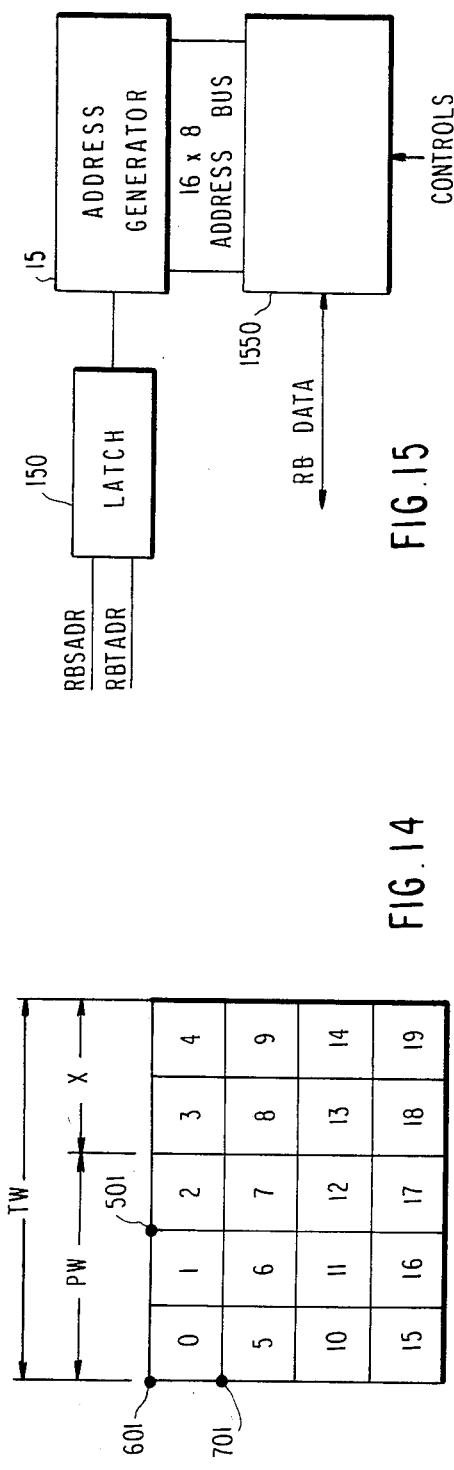

FIG. 16

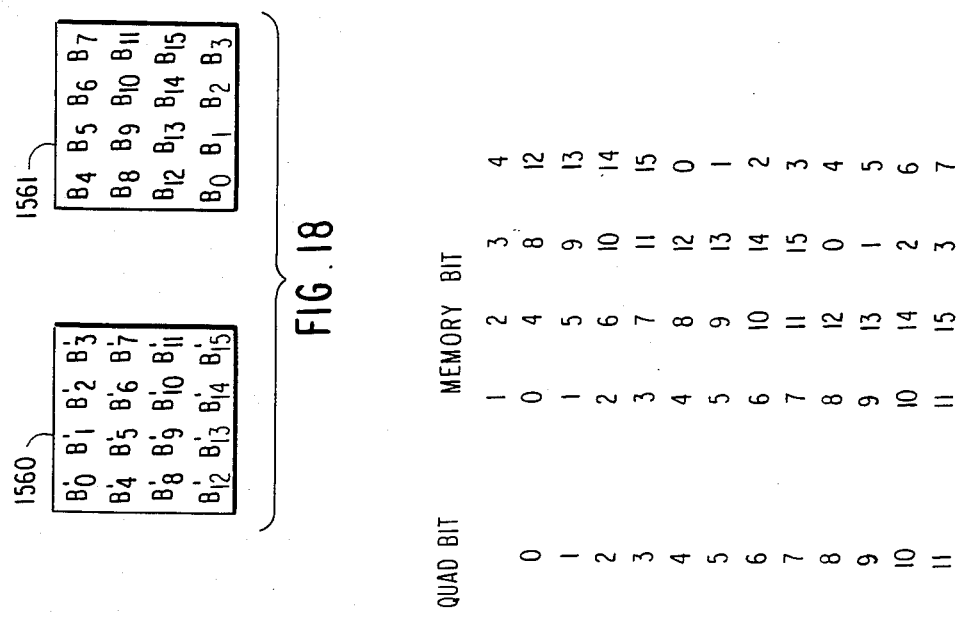
FIG. 18
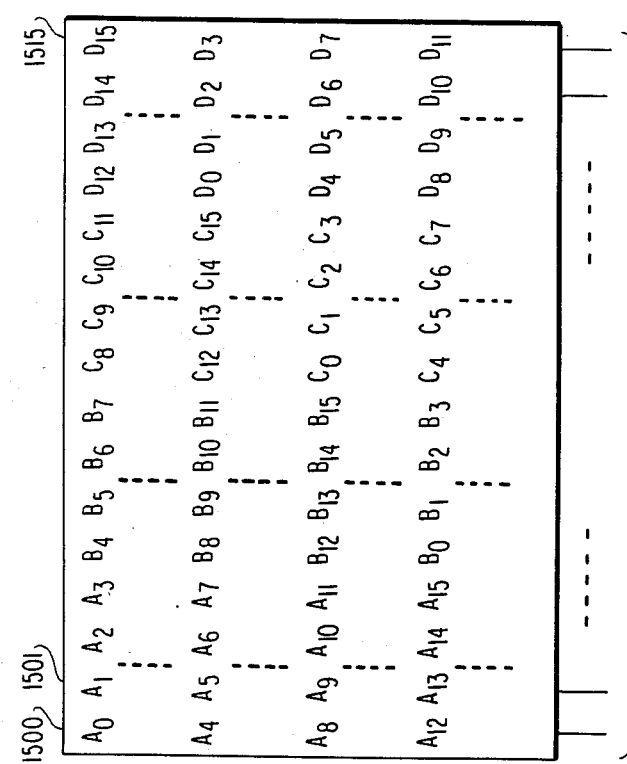
FIG. 19
FIG. 17

METHOD AND APPARATUS FOR IMPROVED PRINTING IN A SELECTED ORIENTATION

DESCRIPTION

1. Technical Field

The present invention relates to the field of printers, and more specifically, to printers capable of reproducing information in any one of a selected number of orientations with respect to a record sheet (or other media) on which the information is to appear.

2. Background Art

The present invention is an improvement over the method and apparatus described in Lotspiech U.S. Pat. No. 4,271,476. Lotspiech describes the problems to be overcome in producing a printer which must be capable of presenting information (alpha-numeric or graphics) in any one of a number of selected orientations with respect to the media on which the information is presented. It should be understood that while the terms "printer" and "media" as used herein can refer to a device for producing images on a sheet of record paper, the terms "printer" and "media" also apply to other types of mechanisms and media, for example presenting information on the face of a CRT.

Lotspiech cited patents representative of the state of the art for rotating data, and mentioned U.S. Pat. Nos. 3,083,445; 3,925,765; 3,483,511; 3,792,194; 3,188,386; 3,922,059; 3,959,582; 3,641,260; 3,629,495; 3,902,047; 3,569,616 and Swiss Pat. No. 573,149. Because data rotation must be accomplished with non-coded data (that is, a bit image of the data), and such non-coded data is very extensive, the prior art techniques for rotating data required the presence of massive memories and were slow.

Lotspiech proposed a system in which an image to be printed is logically divided into sections, and each section is rotated independently of other sections. He indicated that by rotating the scan direction, one section at a time, only a relatively small amount of storage space is required to effect rotation. He provided apparatus for first decompressing at least a portion of a compressed image. The decompressed data may then be divided into sections by windowing logic, and finally, these sections are rotated. When at least two sections have been rotated, they can then be recompressed and stored back in the file. After all of the data has been decompressed, sectioned, rotated, recompressed and stored back in a file, it can then be printed with a selected orientation or rotation. Lotspiech notes that the apparatus for performing the rotation forms a part of and interacts with the printer system in such a way rotation of the image is accomplished during receipt or transmission of the image when the data rate is relatively low and the time required to perform rotation does not become a problem.

The present invention seeks to improve the Lotspiech invention by increasing the speed of operation, to such an extent that it is possible to rotate the data representing an image while the data is being output to the print mechanism (or other output device), to provide the ability to rotate on the fly.

In accordance with the invention, a first memory is provided for storing data representing an image or an image portion. In one embodiment of the invention, the first memory has no particular correlation with the image which is being printed, except that each of the components of the image being printed appear, at some place in the first memory. Accordingly, the image to be printed can be designated by identifying the components of the image (the location in the first memory where a bit of each component may be found) and their locations relative to each other. With this identification, then, the image representing data can be accessed in the order in which components of the image appear in the image being printed. Since a particular component of the image may be repeated a number of times (such as a particular alpha-numeric character), the storage requirements for the first memory are considerably reduced. In accordance with the invention, the component representing image data is subdivided so that each subdivision is separately accessible. In a particular implementation of the invention, this subdivision is termed a quad, for it represents a matrix of $4 \times 4$ bits. Because of the limited nature of the quad, the apparatus required to manipulate the quad to provide for rotation is relatively simple.

The invention also provides a print buffer from which data will be extracted in a regular order and provided to the print mechanism. In one implementation of the invention, the print buffer represented one vertical inch of the image, arranged as a circular buffer, with one half-inch being available for reading for the print mechanism (emptying), and the other one half-inch being available for writing of rotated data (filling). Filling and emptying proceed simultaneously, with the filling remaining one-half of the buffer "ahead" of the emptying. To enable such operation it is necessary to be able to rotate data as fast as it can be written/read. That is a goal of the invention.

In order to operate the print buffer in this fashion, it must be provided with the capability of being addressed in distinctly different fashions. For reading purposes, the print buffer must be arranged to be read out in a linear fashion, for example from left to right in a horizontal scan, followed by another left to right horizontal scan immediately below the first, and so on. On the other hand, in order to write the rotated data so that it appears properly rotated, the addressing mechanism must also be capable of scanning horizontally, right to left as well as left to right, and scanning vertically, up as well as down. In addition, because different orientations of a quad require different placement with respect to preceding quads, the starting location for writing any quad must be determined in dependence on the particular rotation being effected.

Thus the invention provides a method of printing information in a selected one of a plurality of orientations with respect to a media, said method comprising the steps of:

a. providing a first memory storing a first representation of components of said information, said first memory arranged to be read to produce a signal representative of an associated component oriented in one particular orientation, b. providing a second memory for driving a printer with a signal representing said information to be printed, oriented in said selected one of said orientations, c. providing a register for storing an indication of the components stored in said first memory making up said information and said selected orientation, d. addressing each of said first representations in an order determined by said register to produce said signal, e. rotating each first representation in turn as it is read from the first memory in accordance with said command register, f. addressing said second memory and writing the first representation rotated by step (e) so as to write the first representation in the rotated order but to write in a particular location of the second memory determined by the selected rotation.

As described above, each representation of a component is stored in the first memory and is subdivided into a plurality of data sets of quads. In accordance with another aspect, the invention provides a method of transferring a data set, representing a portion of an image, from a first storage device to a second storage device to provide for production of an image with a selected rotation as said second storage device is read, said method comprising the steps of: p0 a. arranging the data set in a predetermined order at said first storage device, b. providing a representation of a desired rotation and a representation of a desired home location in said second storage device at which location said data set is to be retrieved from, c. providing a pair of counters for addressing said second storage device, d. initializing said counters in dependence on said home location and rotation representations, e. reading said data set from said first storage device, f. writing said data set to said second storage device, and g. as said data set is being written, modifying said counters in content, in an order and direction dependent on said rotation representation.

As described above, step (f), writing the data set, includes the step of reordering the data set in a fashion dependent on a desired rotation. For some rotation, step (g) provides for incrementing both counters, for another orientation step (g) includes incrementing one counter and decrementing another, and finally for another orientation, step (g) provides for decrementing both counters. The location to which the counters are initialized also depends on the particular orientation or rotation. In some cases, the counters are initialized to the home location, especially for zero rotation. On the other hand, one or the other of the counters may be initialized to a start position offset from the home location by an amount related to the width or the height of the image portion represented by the data set.

In order to write in the appropriate locations, during the writing of any particular data set, one of the two counters is modified for each quad which is being written. On the other hand, the other of the two counters is only modified once after a number of quads has been written corresponding to the width or height of the data set. Which of the counters is incremented per quad, and which of the counters is not, depends on the rotation or orientation. Since quad data is written and read in parallel (16 bits wide), writing a quad takes no more time than writing a single bit.

The first storage device referred to above is in effect a "library" of different image components. However, the invention is not limited to use with such a "library". Rather, in another embodiment of the invention, the first storage device can actually store a bit map of the entire image.

BRIEF DESCRIPTION OF THE DRAWINGS

The present invention will now be further described in the following portions of this specification so as to enable those skilled in the art to make and use the same in connection with the attached drawings in which like reference characters identify identical apparatus and in which:

FIGS. 1–4 represent a selected image portion, e.g. a quad, in four different orientations;

FIGS. 5 and 6 show how an image pattern, made up of a number of quads, is written to memory in a rotated fashion;

FIG. 7 is an overall block diagram of the invention showing its interconnection with other components for the transmission of commands and the reception of rotated data for printing;

FIGS. 8–11 illustrate a typical image pattern made up of a plurality of quads in each of four possible rotations;

FIG. 14 is useful in explaining use of the pattern store 46;

FIG. 15 a block diagram of the raster buffer 44 of FIG. 7; and

FIGS. 16–19 describe the physical layout of the raster buffer 44.

DETAILED DESCRIPTION OF PREFERRED EMBODIMENTS

Figure 12:
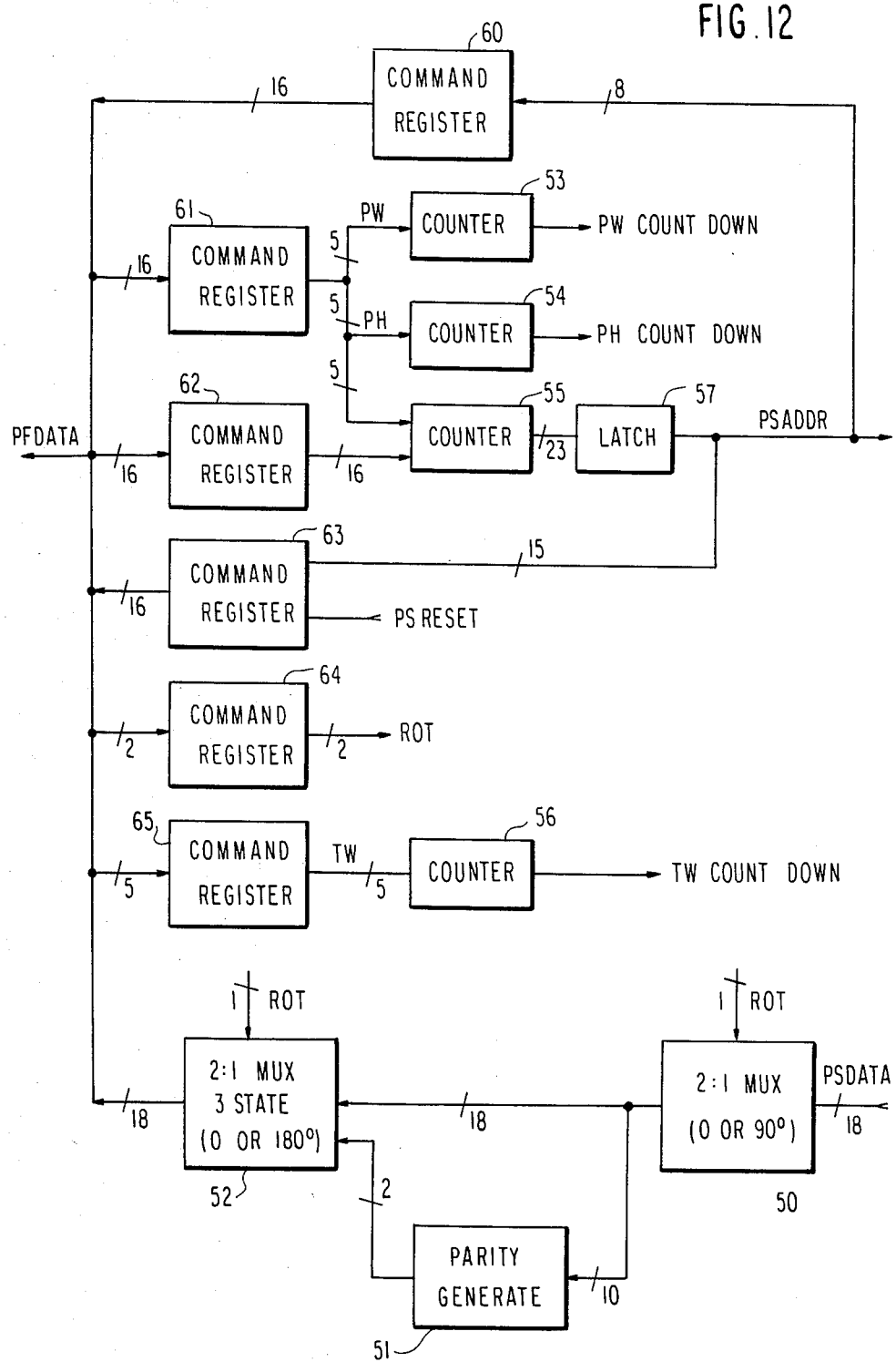
FIG. 12 is a block diagram of the pattern store interface 42 of FIG. 7.

Before describing a preferred embodiment of the invention, reference is made to FIGS. 1–6 to illustrate the principles of the invention. FIG. 1 illustrates a particular bit map 20. The designations 0–15 represent bit positions, and for any particular image pattern or portion, each of the bits may be on or off. If the bit map is rotated 90° (clockwise), then it takes the form of bit map 21 in FIG. 2. Likewise, additional 90° rotations produce the bit maps 22 and 23 in FIGS. 3 and 4, respectively. For shorthand purposes, we can use the designations 30–33 (FIGS. 1–4) to represent a particular orientation of a typical bit map, data set or quad. The apparatus to perform the bit manipulation for limited data sets shown in FIGS. 1–4 is well within ordinary skill in the art. Once the bits have been reordered, they are typically rewritten into some memory device in their reordered fashion.

FIG. 5 represents an image component subdivided into 12 such data sets or quads. If such an image component is to be rotated 90° clockwise, then FIG. 6 shows the resulting image. In the example we have given thus far, each quad includes 16 bits and thus the image of FIG. 5 represents 192 bits. If we do not modify the addressing mechanism of a memory to which these 192 bits are to be written, we must somehow handle all 192 bits at the same time. This is for the reason that the first bit to be written to produce FIG. 6 is bit number 12 of the lower left-hand quad (of FIG. 5). Then we must produce, in order bits 8, 4 and 0 of the lower left-hand quad and then continue by producing bits 12, 8, 4 and 0 of the left-hand intermediate quad and finally bits 12, 8, 4 and 0 of the upper left-hand quad. In accordance with the invention we first rotate the bit map for the quad in the upper left-hand corner of FIG. 5 and then write into FIG. 6 the quad from the upper left-hand corner of FIG. 5 in the upper right-hand corner of FIG. 6. We proceed serially in the order in which the quads appear in FIG. 5 and by appropriately controlling the addressing, place those quads in the proper position in FIG. 6. Thus, depending on the particular orientation or rotation, the addressing order changes. For example, in the case of a 180° rotation, we would first write the quad to the lower right-hand corner; for a 270° rotation we first write the quad to the lower left corner. Thus, the order in which we write quads is the order in which they appear in the unrotated image or image portion but the location at which any quad is written depends on the desired rotation.

FIG. 7 is a high level block diagram of the image generator which can be used to rotate images in accordance with the invention. The image generator itself is shown between the dashed lines at the left and the right. As shown in FIG. 7, the image generator includes a command sequencer 41, a pattern store interface 42, a raster buffer interface 43, a pattern store 46, a raster buffer 44 and a printer data interface 45.

In normal operation, the command sequencer 41 receives information describing the image to be created. This image information includes at least an identification of the different components of the image, and their relative placement in the image, along with an indication of the desired rotation. In accordance with the embodiment of the invention being described, rotation is limited to one of four different orientations, 0° rotation, 90° rotation, 180° rotation or 270° rotation. The command sequencer 41 can interpret the identification of each component to locate the image data or bit map of the component as stored in the pattern store 46. The image data stored in the pattern store 46 is stored for one of these four rotations, and it is an advantage of the invention that the particular image data can be rotated to any of the four available rotations, and integrated with other rotated or non-rotated image components to produce a complete image.

In order to produce this result, the command sequencer 41 interacts with the pattern store interface 42 and the raster buffer interface 43. The pattern store interface 42 has two functions, when addressed by the command sequencer 41 it can access selected locations in the pattern store 46 to extract image data stored therein. The pattern store interface 42 can also rotate the image data received from the pattern store 46. In order to limit the amount of equipment required in the pattern store interface 42 to effect the rotation, each image component, as stored in the pattern store 46, is subdivided into a plurality of quads, each quad is individually addressed and read out. In one implementation of the invention each quad includes 16 bits in a 4×4 matrix. This quantity of data can readily be rotated, and is rotated if necessary by the pattern store interface 42. The rotated data is then transmitted by the pattern store interface 42 to the raster buffer interface 43. The raster buffer interface 43 passes this data along to the raster buffer 44. However, in order to provide for rotation, the raster buffer interface 43 includes special addressing circuits to address the raster buffer 44 in a manner dependent upon the desired rotation. Thus, while the quads from pattern store 46 are read out in a predetermined order (corresponding to 0° rotation) and they are written to the raster buffer 44 in the same order, the location in the raster buffer 44 at which the quad is written (relative to previously written data in the raster buffer 44), depends on the desired rotation. This operation is repeated for each of the quads called for in the particular image component, and then proceeds on to other quads for other image components. As soon as the raster buffer 44 is sufficiently filled, it can be read out by the data interface 45 to drive the printer.

This operation is illustrated in FIGS. 8-11. FIG. 8 shows the bit map of a particular 5×4 (20 quad) image component 34 as stored in the pattern store 46. In the event that the image component does not require rotation, it is written, quad by quad, into the raster buffer 44 in exactly the same fashion as shown in FIG. 8 in the order Q1-Q20. On the other hand, if we require 90° rotation, then as each quad is read out from the pattern store 46, it is rotated (by the pattern store interface 42) and written into the raster buffer 44 as shown in FIG. 9 wherein the order is again Q1-Q20. It will be apparent that the addressing for the raster buffer 44 must be different for 0° and 90° rotation.

FIG. 10 shows the rotated image pattern in the raster buffer 44 for the case of 180° rotation and FIG. 11 shows the image pattern 37 as stored in the raster buffer 44 for 270° rotation. In all cases, the order of writing quads is Q1-Q20, and it will therefore be apparent that depending on the amount of rotation, the addressing of the raster buffer 44 must vary.

The command sequencer 41 is merely a digital processor. It is arranged to receive the data defining the desired image, including an identification of each of the image components and its relative location to the other image components, along with an indication of the desired rotation. Based on its programming, the command sequencer 41 identifies the particular components in the pattern store 46 which must be read out to produce the desired image, as well as the order in which this data will be read out. The identification of each component includes the location of each quad making up the component. The command sequencer then places on the PF BUS, command signals to initialize the pattern store interface 42, and then outputs the necessary addresses, on the PF BUS. The pattern store interface 42 then addresses the pattern store 46, over the PS BUS, extracts the data, rotates the data, quad by quad, and passes the rotated data along to the raster buffer interface 43 (through the PF BUS). The raster buffer interface 43 has also been initialized by the command sequencer 41 with the desired rotation as well as with a home location for the component. The raster buffer interface 43 identifies, from the home location and the desired location, the start location in the raster buffer 44 at which each quad will be written. As the rotated quad data is passed over the PF BUS to the raster buffer interface 43, it is properly addresses the raster buffer 44 over the RB BUS so that each quad or data set is written to the appropriate location. When all data for a particular component (each quad) has been processed, the command sequencer 41 begins the cycle again for the next component. In this sequence, the raster buffer is filled.

Independently, the raster buffer 44 is being read by the data interface 45. In accordance with the invention, aside from administrative overhead, for initializing the pattern store interface 42 and the raster buffer interface 43, quad data is rotated and written to the raster buffer 44 as quickly as it is being read out, thus satisfying the goal of the invention to provide for data rotation "on the fly".

The pattern store 46 is not described in detail inasmuch as it can comprise a conventional RAM (or ROM). For speed purposes, we desire that the quads be read in parallel (16 bits at a time), processed and written in parallel to the raster buffer 44. Thus, a typical pattern store 46 would include 16 memory modules, each one bit wide. Addressing such a memory provides us 16 bits in parallel. The quads making up an image component are read sequentially (in the zero rotation orientation) and thus they would normally be stored serially.

Referring now to FIG. 12, a block diagram of the pattern store interface 42 is described. This element receives data on the PF BUS (shown as PFDATA in FIG. 12) and places data back on the PF BUS. The pattern store 46 is addressed over the PSADDR BUS, and data from the pattern store 46 flows through the pattern store interface (from right to left) on the PADATA BUS. This bus is 18 bits wide to handle 16 bits of data and 2 bits of parity.

Two bits provided by the PF BUS are stored in command register 64 identifying the desired rotation. Since we admit four different rotations, two bits suffice. These two bits ROT are provided, one bit each to the 2:1 multiplexers 50 and 52. The control bit for the multiplexer 50 is on or high for 90° rotation, and off or low for 0° rotation. The 16 data bits input to the multiplexer 50 provide inputs to two different stages of the multiplexer. The output of one stage of the multiplexer is connected on a one for one basis with its inputs (0° rotation). The output of the other stage of the multiplexer is connected in a fashion to provide for 90° of rotation. The control bit selects which stage of the multiplexer will drive the 16 data bits on the bus connecting the multiplexer 50 to the multiplexer 52. The control bit to multiplexer 52 identifies 0° or 180° rotation. Like the multiplexer 50, the multiplexer 52 includes two stages, each with 16 input and output data bits. One stage has its inputs and outputs connected together, the other stage has its inputs and outputs connected in such a fashion as to provide for 180° of rotation. Which stage provides the drive for the 16 data bits forming the PF BUS is selected by the logic level of the control bit. Thus, the multiplexers 50 and 52 provide for 0°, 90°, 180° or 270° (270° of rotation is obtained when both central bits are on) rotation. The parity generator 51 provides two bits of parity from the output of the multiplexer 50 which is used to generate the parity bits on the PF BUS.

The pattern store interface (FIG. 12) also allows a portion of a component (or pattern) to be printed (as opposed to the entire component). The portion of the pattern to be clipped or eliminated may consist of any contiguous groups of quads either at the top or bottom of the pattern (in the vertical direction) or at the right or the left (in the horizontal direction). Refer for example to FIG. 14 which shows a 20 quad pattern, of total width (TW) five quads, and height four quads. In the example being described, the eight quads extending vertically at the right of the pattern are to be clipped. Thus the relevant width dimension (PW) is three quads. We can use the designations 0-19 to identify each quad in the pattern store 46, e.g. these numbers represent the address. To print the entire pattern, the pattern store 46 is addressed sequentially. If it is desired that only the left-most three columns (as shown in FIG. 14) are to be printed, the pattern store must be addressed in the following sequence: 0-1-2, 5-6-7, 10-11-12, 15-16-17. This is implemented by instructing the pattern store interface 42 that the pattern is three quads wide by four quads high, and the total pattern width is five. The pattern width and pattern height respectively are coupled through the command register 61, to initialize the counters 53 and 54. The total width value is coupled through the command register 66 to initialize the counter 56. In this case, the portion of the pattern to be clipped is at the right and therefore we begin extracting quads immediately, and terminate when the pattern width is exceeded. The pattern width count is reset after one horizontal scan, and again terminated when it is down-counted to zero. The scan is terminated when the counter 56 is down-counted to zero.

On the other hand, if we desire to clip the left side of the pattern, then we specify a different starting address, for example if we desire to clip the left-most two columns, we would start at location 501 rather than location 601.

We can also clip in the other dimension, e.g. the top row or rows of the pattern or the bottom row or rows of the pattern. For example if we desire to clip the top row, we would specify the total height as one less than the actual total height and provide the starting address at 701. Likewise, if we wanted to clip the bottom row, we would use the initial starting address as 601, but specify the total height as one less than the actual height.

Figure 13:
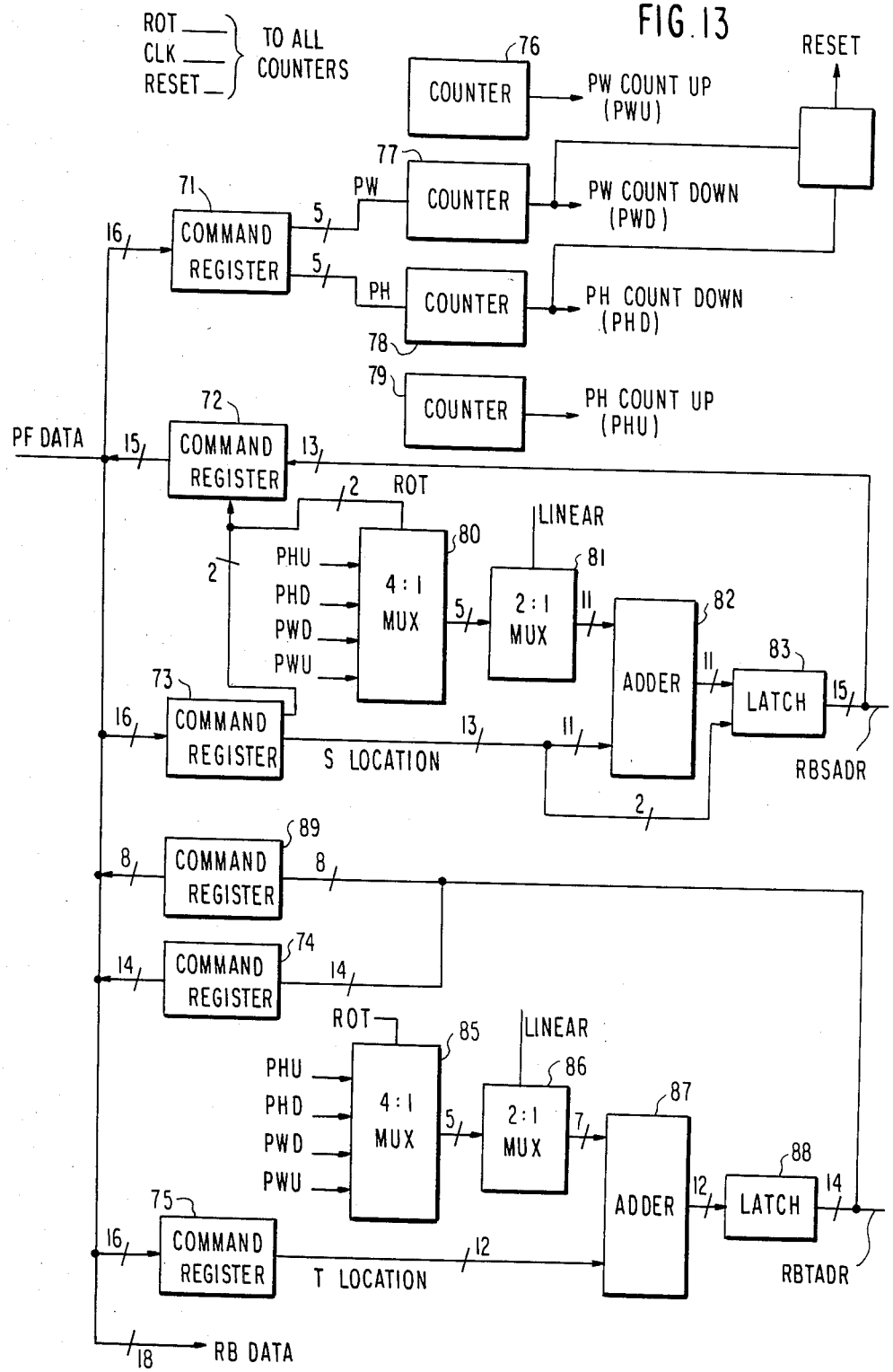
FIG. 13 is a block diagram of the raster buffer interface 43 of FIG. 7.

FIG. 13 is a block diagram of the raster buffer interface 43. Quad data flows through the raster buffer interface from left to right, from the PF BUS, where it is directly connected to the RBDATA BUS. Intermittently, the PF BUS carries address data from the command sequencer 41. This address data (identifying a home location) is initially input to the command registers 73 and 75 respectively. The data input to command register 73 also includes two bits of rotation identification. These two bits are provided to control 4:1 multiplexers 80 and 85, respectively. Prior to reading a component from the pattern store 46, the command register 71 is initialized with data identifying the pattern width and pattern height, in quads. This data is used to initialize counters 77 and 78, respectively. The data employed is actually one less than the width and height respectively. The counters 76, 77 are clocked once per quad, at the rate that quads are being processed. Thus, as they are clocked, they produce the signals PWU, PWD, PHD and PHU, respectively. The counters 76 and 79 count up for width and height quads, respectively. These counters thus identify how far the quad pattern has progressed in the width and height dimensions respectively. The counters 77 and 78 count down, from the total width and total height of the pattern, respectively.

Regardless of rotation, once per quad the counters 76 and 77 are clocked, counter 76 counting up and counter 77 counting down. When counter 77 overflows, a reset signal is generated and is applied to the counters (delayed) to produce the following effects. Counter 76 is reset to zero, counter 77 is reset to the pattern width. Counter 78 is decremented and counter 79 is incremented.

For each of the S and T dimensions (S can be considered horizontal and T vertical, for discussion purposes), a separate counter is provided. The S counter comprises the command register 73 (containing the home S address) which provides one input to an adder 82. The other input to the adder is selected by the 4:1 multiplexer 80, coupled through the 2:1 multiplexer 81. The output of the adder 82 is latched in a latch 83. This counter can count up or down by virtue of the changing contents in the counters 76-79 and the selection of the 4:1 multiplexer 80. In addition, the counter may count once per squad or it may count once per pattern width or height, as will be described below.

There is also a T counter comprising similar components (register 75, multiplexers 85, 86, adder 87, latch 88) with similar effects.

For 0° rotation, the 4:1 multiplexer 80 selects its PWU input and the 4:1 multiplexer 85 selects its PHU input, the effect of this will be described below. For each of the rotation possibilities, the table directly below identifies the effective input to the multiplexers 80 and 85 in the columns headed respectively 80 and 85.

| Rotation (Degrees) | S | T |
|---|---|---|
| | 80 | 85 |
| 0 | PWU | PHU |
| 90 | PHD | PWU |
| 180 | PWD | PHD |
| 270 | PHU | PWD |

For the 0° rotation case, the first address to be written in the raster buffer is identified by the home location passed to it from the command sequencer 41. In the S dimension the home address is contained in the register 73, in the orthogonal T direction the address is contained in the register 75. For other rotations, the registers 73 and 75 contain the same home address, but that address will be modified before it is used. How FIG. 13 manipulates this address information is described in connection with FIGS. 8-11. The addresses sent to the raster buffer can be denoted Sa and Ta (output by the latches 83 and 88 respectively). For the 0° rotation case, the starting location is the home address, e.g. S, T. As a quad is written, the S address is incremented. To effect this the 4:1 multiplexer 80, for the 0° rotation case, selects the PWU input. Thus, after the first quad has been written the PWU input is 1. This is coupled through the 2:1 multiplexer 81 (which has no effect for quad mode addressing of the raster buffer) and provides one input to the adder 82. The other input to the adder 82 is the original S location from the command register 73. Of course, the sum is one more than the original S location and that is latched into the latch 83 to provide the updated S address (RBSADR). At the same time, the 4:1 multiplexer 85 selects the PHU input. However, the counter 79 is not yet incremented. Thus, while the S address changes by unity, the T address does not change. In this fashion, the raster buffer which had originally been addressed at location 100 is now addressed at location 101. After writing Q2, the operation is repeated, e.g. the S address is incremented to address location 102. This operation continues through writing at address 103. Thereafter, we have proceeded through the entire width of the pattern and the counter 77 has been decremented past zero. For the 5 quad wide of FIG. 8, counter 77 is initialized at four (one less than the actual width in quads). After Q1 is written counter 77 is decremented. After quad Q4 is written counter 77 is decremented to zero. After quad Q5 is written counter 77 is again decremented, and overflows. This allows counter 76 to be reset to zero, counter 77 is reset to the pattern width (one less than actual), counter 78 is decremented by one (from the original pattern height less one) and counter 79 is incremented.

As a result, after addressing location 103, the next address location is 104. This allows us to write quad Q6. The operation proceeds exactly as addressing for locations 100-103 until after address location 105 is written, with quad Q10. The counters are reset and the same operation ensues. In this fashion quads Q11-Q20 are written.

In summary, for the 0° rotation case, the home location is used as the start location, the S location is incremented once per quad, and the T address is incremented once per pattern width.

For the 90° rotation case, the start location is not the home location (R). Rather (and refer to FIG. 9 now), the start location is location 201. This is implemented in this rotation case by the 4:1 multiplexer selecting the start location as the home location (in the S dimension) plus the pattern height (again less unity). Referring to FIG. 8, the pattern height is three quads (the actual height, less one), and that is location 201, in the S dimension. Thus the 4:1 multiplexer 80 selects the PHD input. As a result, the address latched in the latch 83 is the home location (S) plus PHD. The address latched into latch 88 is the T location, as is shown in FIG. 9. For the 90° rotation case, we scan vertically, down. As a result, we use the output of counter 76 (which is incremented once per quad). Thus, 4:1 multiplexer 85 selects the PWU input, so that after the first quad is written the value latched into latch 88 is the original T address plus one. This moves us to location 202, for the next quad to be written. This process is repeated, counter 76 counting up for incrementing the value in the latch 88. When the location 203 is written, the counter 77 overflows, resetting itself to the original width, resetting counter 76 to zero, incrementing counter 79 and decrementing counter 78. For the 90° location case, the 4:1 multiplexer 80 selects the PHD input and thus when counter 78 is decremented, the value stored in the latch 83 is decremented to take us to address 204. The same operation continues until quads Q1-Q20 are written in the locations shown in FIG. 9.

In summary, for the 90° rotation case, the start location, in the T direction is the home location but in the S direction is the home location plus the pattern height. As each quad is written, the T location is incremented until the PWD counter is decremented to zero, and this allows the PHD counter to be decremented.

In the 180° rotation case, we want to begin writing at location 301 (see FIG. 10). Thus, rather than using the home location (R), in the S dimension (R) is summed with the pattern width for the start location and in the T direction it is summed with the pattern height. This is implemented by the multiplexer 80 selecting the PWD input to add to the S location to provide a sum in latch 83, and the multiplexer 85 selects the PHD input for adding with the T dimension of the home location to achieve a start location sum in latch 88. The next address desired is address 302; in the T dimension no change is made but in the S dimension we are decrementing. This is the result of the multiplexer 80 selecting the PWD counter and allowing this counter to decrement once per quad. After writing at location 303 the PWD counter overflows allowing itself to be reset, and allowing the counter 78 to be decremented and the counter 79 to be incremented. Since we have selected the PHD input for multiplexer 85, the resulting resetting action brings us to location 304. The addressing proceeds in this fashion until quads Q1-Q20 have been written.

In summary, for the 180° rotation case, the start location in the T dimension is the home location plus the pattern height, and the start location in the S direction is the home location plus the pattern width. We decrement, in the S dimension, once per quad until we have written an entire pattern width at which time the width counters are reset, and the height counters are altered, e.g. counter 78 is decremented and counter 79 is incremented.

Finally, for the 270° rotation case (see FIG. 11), the initial address we are to use is address 401. This is our home location (R) in the S dimension, but in the T dimension it is the home location plus the pattern width. This is implemented by the multiplexer 85 selecting the PWD input. As a result, the sum identifying the start location in the T direction found in latch 88 is the home location in the T dimension added to the pattern width. As each quad is written we decrement in the T dimension (since the counter PWD is decremented once per quad). When the counter PWD overflows, we reset counters 76 and 77, decrement counter 78 and increment counter 79. Multiplexer 80 selects the PHU input which is incremented once per pattern width, bringing us to location 402. In this fashion we proceed to write quads Q1–Q20 in the locations shown in FIG. 11.

In summary, for the 270° rotation case, the start location is, in the S dimension, the home location, but in the T dimension it is the home location plus the pattern width. For each quad, we decrement in the T dimension until an entire pattern width has been written. We reset the pattern width counters 76, 77, and increment the S dimension.

Registers 72 and 74 are used in diagnostic operations. Register 89 identifies the currently addressed location in the raster buffer 44 and is used for output control.

In summary, the invention provides for "on the fly" data rotation of what would otherwise be unwieldy bit patterns. The invention is implemented by selectively addressing the raster buffer during the course of writing in a manner dependent on the particular rotation which is desired. For example, for 90° rotation rather than addressing at locations 100, 101, 102, 103, etc., we address locations 201, 202, etc. through 203, and then 204, etc. For 180° rotation, we address locations 301, 302, 303 and then location 304. Similar alterations of the writing addressing are provided for 270° rotation. The circuits used to control the addressing, shown in FIG. 13, do not include any complicated multiplying, dividing, or other logic apparatus, rather using simple multiplexers, adders and latches which have minimal or negligible delay. Once initialized, the address processing can proceed almost as fast as the process of writing a bit to the memory. This technique provides for locating quads in the desired location. The technique of subdividing a pattern or image component into sub-divisions allows us to employ fast acting hardware for the bit level rotation, we provide for any of 0°, 90°, 180° or 270° rotation using two simple multiplexers.

It should be understood that while the invention has been described employing unit data sets of a matrix of 16 bits, that is not at all essential to the invention. For example, a 4-bit matrix, 2×2, could also be employed, and even a 256-bit matrix, 16×16, could be contemplated.

Figure 16:
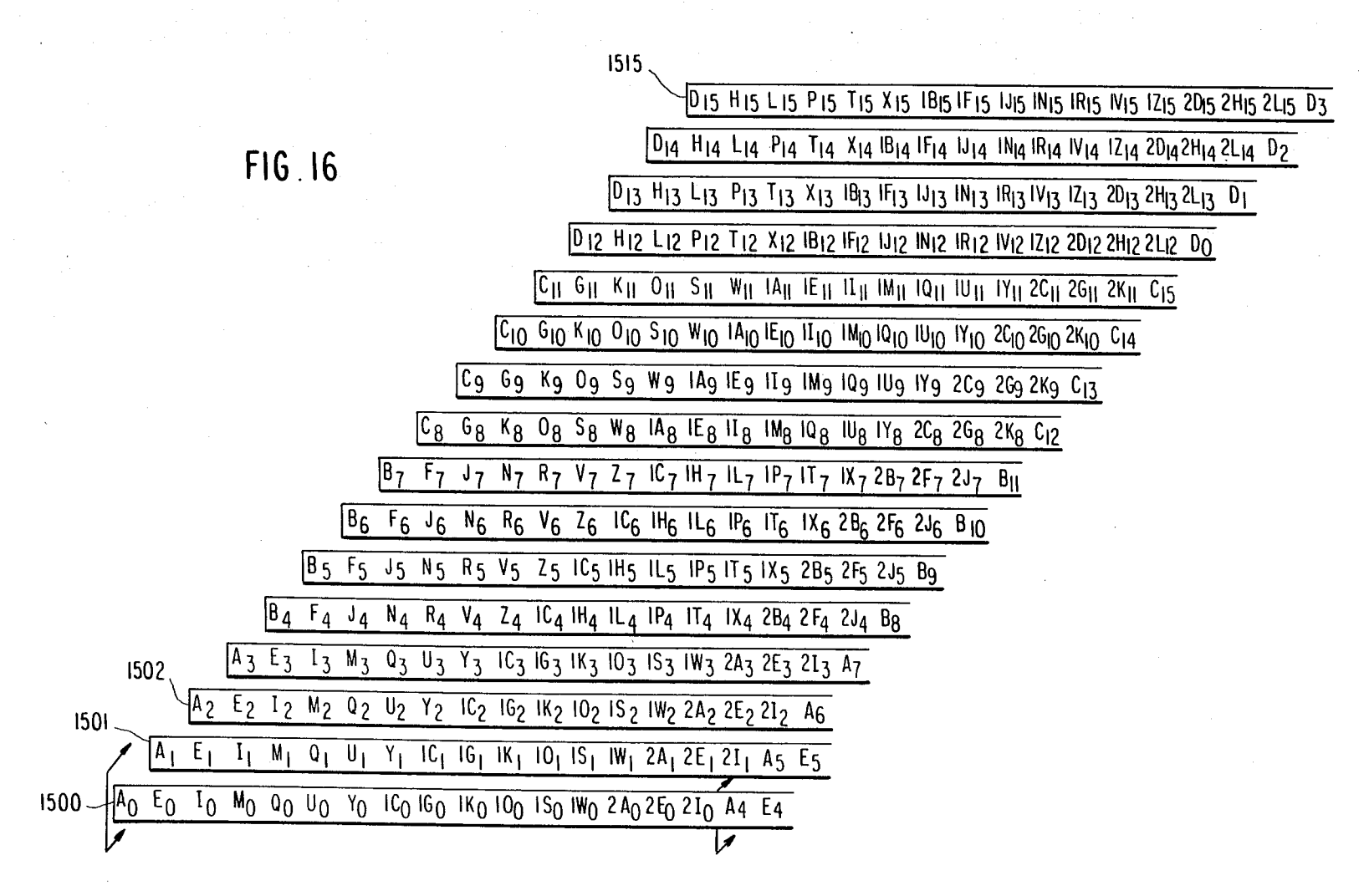

The foregoing explains how a random access memory can be written with quads, each quad placed relative to preceding quads so as to provide for speedy and efficient rotation of bit image portions and bit images. In order to maintain the speed advantage, we should be able to read out the memory as quickly as possible, preferably in linear scan. In order to read out quickly, we arrange the memory so that we can read out 16 bits in parallel, and of course those 16 bits consist of (and referring to FIG. 9 for example) the first four bits (the upper row) of each of quads 16, 11, 6 and 1, respectively. The next 16 bits read out would be the corresponding 16 bits of the adjacent image pattern, until an entire "row" has been read. This is implemented by providing the memory 1550 (see FIG. 15) with a 16-bit wide data bus, in fact the RBDATA BUS. In one implementation of the invention, the memory 1550 consists of 16 memory modules, each 64K×1 bit. Referring to FIG. 16, portions of each of these 16 memory modules, 1500–1515 are illustrated. The RBDATA BUS can provide one bit from each memory module. FIG. 16 shows the contents of several bit locations in each memory module wherein the alphabetic characters A, B ..., 1A, 1B ..., 2A, 2B, ..., etc. identify different quads. Thus, the first location in the first four modules include bits $A_0$ through $A_3$ of a first quad A. The next four modules contain four bits from the next quad, B, the next four modules contain four bits from the next quad, C, and so on. Because we only have 16 modules, and we desire to employ 16 16-bit words for a single scan, the second bit position of the first four modules does not include any data from the A quad, rather it includes four bits from a different, E quad. The 16th bit position in modules 1500–1503 include four more bits from the A quad. It is of course a coincidence that the width of our word (16 bits) and the number of words per scan (16) is identical, and actually this can vary quite widely. FIG. 17 illustrates the physical layout of the memory, in the more familiar matrix pattern, however, arranged so as to more closely correlate with the physical layout of FIG. 16. Each vertical column in FIG. 17 corresponds to a different module, and by reading the top row (the first bit position) of each of the modules 1500–1515, we can see the relationship between FIGS. 16 and 17. As one consequence of the physical layout, the 16 bits from any quad are displaced from each other, and the intermediate bit locations are occupied by bits from quads on the scan row which begins with the bits $A_0$, $A_1$ and proceeds through the bit preceding $A_4$. $A_4$ is the first bit of the second scan row, the second scan row includes bits A4, A5 through the bits preceding $A_8$, and so on.

An additional consequence of this arrangement is that certain quads are arranged so as to naturally completely correlate with the bit pattern in the pattern store 46. Other quads, however, quads B, C, D, for example, are not so naturally correlated. More particularly, reference is made to the fact that the initial four bits of quad B are $B_4$–$B_7$ as opposed to $B_0$–$B_3$. FIG. 18 shows this more clearly. FIG. 18 shows the bit pattern 1560 of the quad as it appears in a pattern store 46, whereas 1561 shows the bit pattern of the quad as it is stored in the raster buffer. Since we desire to have the bit pattern as printed correspond to the bit pattern in the pattern store (aside from any rotation), we must somehow translate the 16 bits of the pattern store bit pattern so that when they are stored in the raster buffer, no change is encountered.

FIG. 19 is a table correlating the input quad bit to the manner in which the bit is treated for each of four different quads, it should be understood that there are only four different cases corresponding to the quads A, B, C and D since the pattern repeats, e.g. quad E is treated as quad A, quad F is treated as quad B, quad G is treated as quad C and quad H is treated as quad D, and so on.

Thus, FIG. 19 shows for each input quad bit, input to the memory on the RB data bus, the quad bit identification in memory, for the four different cases. It will be seen that the difference between each of these cases is merely one row vertical shift. That is, quad bits 0–4 are treated as quad bits 0–4 or bits 4–7 or bits 8–11 or bits 12–15, and so on.

In this fashion, when 16 bits are read out, and assuming the four quads in which these 16 bits originate are aligned on the printed page, then the corresponding four bits from each quad is read out (top row, second row, third row or fourth row). This is repeated 15 more times for each scan. After the 16th word is read, the 17th word corresponds to the second row of the first-mentioned four quads, and so on.

We claim:

1. A method of transferring a data set, representing a portion of an image, from a first storage device to a second storage device to provide for production of an image with a selected rotation as said second storage device is read, said method comprising the steps of:
   (a) arranging the data set in a predetermined order at said first storage device,
   (b) providing a representation of a desired rotation and a representation of a desired home location in said second storage device at which location said data set is to be retrieved from,
   (c) providing a pair of counters for addressing said second storage device,
   (d) initializing said counters in dependence on said home location and rotation representations,
   (e) reading said data set in multi-bit groups from said first storage device,
   (f) writing said data in said multi-bit groups to said second storage device and reordering said multi-bit groups in a fashion dependent on said rotation,
   (g) as said data set is being written, modifying said counters in content, in an order and direction dependent on said rotation representation.

2. The method of claim 1 in which, for a predetermined rotation, said step (g) includes incrementing both said counters.

3. The method of claim 1 in which, for a predetermined rotation said step (g) includes incrementing one counter and decrementing another counter.

4. The method of claim 1 in which, for a predetermined rotation said step (g) includes decrementing both counters.

5. The method of claim 1 in which, for a predetermined rotation said step (d) consists of initializing said counters to said home location.

6. The method of claim 1 in which, for a predetermined rotation said step (d) consists of initializing said counters to a location offset from said home location by an amount related to one dimension of said portion of an image.

7. The method of claim 1 in which, for a predetermined rotation said step (d) consists of initializing said counters to a location offset from said home location by an amount related to both dimensions of said portion of an image.

8. The method of claim 1 in which said step (g) includes modifying one of said counters in content only after another of said counters has been modified in content by an amount related to a dimension of said portion of said image.

9. The method of claim 1 which includes the further step of reading said second storage device in an order independent of said selected rotation.

10. An apparatus for transferring image data, representing a portion of an image, from a first storage device, in which said image data is stored in a predetermined order, to a second storage device to provide for production of an image with a selected rotation as said second storage device is read, said apparatus comprising:
    (a) means for providing a representation of a desired rotation and a representation of a desired home location in said second storage device, at which location said image data is to be retrieved from,
    (b) first and second counter means for addressing said second storage device,
    (c) means for initializing said counter means in dependence on said home location and rotation representations,
    (d) means for reading said image data from said first storage device in a serial order of data sets and in multi-bit groups,
    (e) means for writing said data set in said multi-bit groups to said second storage device and reordering bits within a multi-bit group in dependent on said desired rotation,
    (f) modifying means for changing said counter means in content, as said image data is being written in an order and direction dependent on said rotation representation.

11. The device of claim 10 which further includes:
    linear addressing means for addressing said second storage device to provide an output from said second storage device representing said image, rotated as desired.

12. The device of claim 10 in which said modifying means includes means for incrementing both said counter means for a predetermined rotation.

13. The device of claim 10 in which said modifying means includes means for incrementing one counter means and decrementing another counter means for a predetermined rotation.

14. The device of claim 10 in which said modifying means includes means for decrementing both counter means for a predetermined rotation.

15. The device of claim 10 in which said means for initializing said counter means includes means for initializing said counter means to said home location for a predetermined rotation.

16. The device of claim 10 in which said means for initializing said counter means includes means for initializing said counter means includes means to a location offset from said home location by an amount related to one dimension of said portion of an image.

17. The device of claim 10 in which said means for initializing said counter means includes means for initializing said counter means to a location offset from said home location by an amount related to both dimensions of said portion of an image.

18. The device of claim 11 in which said modifying means includes means for modifying one of said counter means in content, only after another of said counter means has been modified in content by an amount related to a dimension of said portion of said image.

19. A method of rotating an image to allow printing said image in any of a plurality of relative rotations comprising the steps of:

storing a representation of said image in a first memory device, partitioning said representation of said image into plural, multi-bit image representing data sets, each such data set representing an orthogonally scanned image portion, selecting a desired relative rotation and providing a representation of such selected rotation, said rotation measured between an orientation of said image in said said first memory device and a desired image orientation, transferring said data sets to a second memory device from which a printing mechanism will be controlled to reproduce said image at a selected rotation from a region of said second memory device identified by a home position, said transferring step comprising:
(i) selecting an offset, from said home position, to determine a writing location in said second memory device, said offset based on said selected rotation,
(ii) addressing said second memory device at said writing location,
(iii) reading a data set from said first memory device reordering said data set based on said selected rotation and writing said reordered data set into said second memory device at said writing location,
(iv) modifying said writing location by a dimension of said data set, and
(v) repeating steps (ii)-(iv) until all said data sets are transferred to said second memory device.

20. A method of printing information in a selected one of a plurality of orientations with respect to a record medium, said method comprising the steps of:
(a) providing a first memory storing a first representation of components of said information, said first memory arranged to be read to produce a signal stream, each such signal stream representative of an associated component oriented in one particular orientation,
(b) providing a second memory for driving a printer with a signal stream representing said information to be printed oriented in said selected one of said orientations,
(c) providing a register for storing an indication of the components stored in said first memory making up said information and said selected orientation,
(d) addressing each of said first representations in an order determined by said register to produce said signal stream,
(e) rotating each first representation in turn as it is read from the first memory in accordance with said command register,
(f) addressing said second memory and writing the first representation rotated by step (e), so as to write the first representation in the rotated order.

21. The method of claim 20 in which said step (a) includes:
(i) subdividing each said first representation into plural data sets, a size of said data sets selected to provide for ready rotation of said data sets into any of said plurality of orientations,
wherein said step (d) includes:
(ii) addressing said first memory within each first representation so as to address the data sets in a regular order to produce said signal stream,
wherein said step (e) includes:
(iii) rotating each data set in turn as it is read from the first memory in accordance with said command register,
wherein said step (f) includes:
(iv) addressing said second memory and writing the data set rotated by step (e) so as to write the data set in the rotated order but to write in a particular location of the second memory determined by the selected rotation.

* * * * *